United States Patent [19]

Lewis

[11] Patent Number: 4,517,671
[45] Date of Patent: May 14, 1985

[54] APPARATUS FOR OPERATIONAL ANALYSIS OF COMPUTERS

[76] Inventor: James D. Lewis, 100 Second St., Hackensack, N.J. 07602

[21] Appl. No.: 445,578

[22] Filed: Nov. 30, 1982

[51] Int. Cl.³ .............................................. G06F 11/22
[52] U.S. Cl. ........................................ 371/19; 371/16; 371/18
[58] Field of Search ............................ 371/16, 18, 19; 324/73 R

[56] References Cited

U.S. PATENT DOCUMENTS

| | | | |
|---|---|---|---|
| 3,763,474 | 10/1973 | Freeman et al. | 371/19 X |
| 3,937,938 | 2/1976 | Matthews | 371/19 |
| 4,063,081 | 12/1977 | Handly et al. | 371/16 |
| 4,200,224 | 4/1980 | Flint | 371/18 |

OTHER PUBLICATIONS

R. Tenny, Comparator Aids uP Debugging, EDN, 2/5/78, vol. 23, No. 3, p. 23.

*Primary Examiner*—Jerry Smith
*Assistant Examiner*—Mark Ungerman
*Attorney, Agent, or Firm*—Arthur L. Plevy

[57] ABSTRACT

An apparatus for operational analysis of computing devices which, when coupled to the address, data, and control buses of a computer, displays a representation of a selectable subgroup of the bus signals on a bit map display for each occurrence of a selectable condition. The bits of the least and most significant halves of the selected subgroup define the horizontal and vertical coordinates of a display pixel activated upon occurrence of the selectable condition. Selectable groups are address and data bus signals. An optional condition is specification of bit values of signals on the buses. Selectable control bus signal conditions are read or write and input/output or memory. The display is latched with the state of the selectable subgroup upon occurrence of the selectable conditions thereby remaining stable until the next occurence of the selectable conditions. Efficient adaptability to a variety of computer types is provided for by interchangeable personality interconnection modules that interconnect an optimized set of digital logic gates with the computer control bus signals and control condition selection switches. In a preferred embodiment the display is an array of Light Emitting Diodes which are energized by X and Y decoders in accordance with the group of signals selected to be displayed.

8 Claims, 10 Drawing Figures

APPARATUS FOR OPERATIONAL ANALYSIS OF COMPUTERS

BACKGROUND OF THE INVENTION (1) Field of the Invention

This invention relates to electronic computers and data processing systems and more particularly to apparatus for measuring testing, analyzing or monitoring such systems in operation.

(2) Description of the Prior Art

Some prior devices have dealt with the analysis of digital systems in general, but because their target of applications was so wide these devices have been rather complex internally, somewhat difficult to operate, fairly bulky, and not quickly and inexpensively adaptable to a given computer. U.S. Pat. No. 4,040,625 for "Logic State Analyzer" to Morrill, Jr. et al is an example of such prior art devices.

Another prior art device is shown in U.S. Pat. No. 3,805,255 for "Scanning Light Emitting Diode Display of Digital Information" to Baker. This device employs Light Emitting Diodes (LED's) to indicate the logic state of each bit of a sequence of two input streams of binary bits and has the further capability of displaying the results of selected boolean operations on corresponding bits of the input streams of bits. Such a device does not provide a display of signal flow within a computer and no means is disclosed for adapting such a device to analysis of the binary bit signal streams existing in an operating computer system.

Other prior devices have dealt specifically with the analysis of computer systems but have, as a result of using one axis for a time based function, required an expensive, power consuming, large, high-resolution display. Also, no provision for convenient adaption to varying computers was included. U.S. Pat. No. 3,522,597 for "Execution Plotter" to Murphy and U.S. Pat. No. 3,098,219 for "Monitoring Arrangement For Program-Controlled Electronic Computers or Similar Systems" to Voight et al are examples of such prior art devices.

U.S. Pat. No. 3,829,841 for "Computer Monitoring Device" to Steinberg is an example of prior art devices used to provide a graphic display of computer execution of programmed instructions. Such devices are useful as aids in the analysis and error identification in the flow of program instructions in the computer. These devices, however, are very complex and expensive and do not permit selective analysis of specific signals flowing on the signal buses of the computing device under analysis.

Yet other prior devices such as Emulators have been useful in the analysis of computer systems but provide information in alphanumeric format allowing detailed and accurate analysis of precisely requested data, but not allowing the intuitiveness and speed of a graphic display.

In general, a cathode ray tube (CRT) with its size, fragility, power consumption, high voltage, and drive circuits is used in the prior art devices that have graphic displays. In comparison with previous devices, the disclosed apparatus is economically manufacturable, simple to use, portable, readily adaptable to different computers, and presents information in a way that alone is very useful and when used as a supplement to existing tools provides a fresh perspective as an aid to solving difficult problems.

SUMMARY OF THE INVENTION

In contrast with general purpose digital logic analyzers the apparatus of the invention takes advantage of fundamental differences between signal relationships in a general digital logic circuit and those in a computer. The result is a simpler instrument which is easier to operate, more portable, and efficiently adaptable to a wide variety of computers. These fundamental differences are that the relationship between signals in a general digital circuit are often relatively random, whereas those in a computer are usually binary encoded; and that the sequence between logic states in a digital circuit are not readily known, while those related to the flow of a program are usually in a known sequence. Thus, as an example of a benefit derived by the apparatus of the invention from these differences, a simpler, smaller, power efficient, rugged, LED matrix as contrasted with the CRT which is needed to give an inter-pixel vector trace display on existing digital system analyzers in their map mode, can be used.

In most digital computers there is an address, data, and control bus. Each bus consists of several signal paths carrying logic signals. If presented in a digestible way, the information flowing over these buses can be very useful. In accordance with a preferred embodiment of the disclosed apparatus, address, data, and control bus signals of a microcomputer system are monitored, and a representation of a selectable byte-wide group of these signals is displayed on a 16 by 16 matrix of LEDs upon each occurrence of a selectable condition. The least and most significant halves of the selected byte give the X and Y display location of the element which is activated. Conditions that can be selected are bit values on the address bus and the READ, WRITE, I/O, and MEMORY modes of the control bus. The proper LED is latched on upon the occurrence of the selected condition passing state of the buses and remains on until the next occurrence of the selected condition. Only one LED is on at one time although many can appear to be on at once. To allow interfacing to different computers in an efficient way, an optimized set of digital devices are interconnected by interchangeable personality interconnection modules specifically adapted to each computer type.

Using a preferred embodiment of the invention designed for microcomputer analysis, some examples of display modes using a 16×16 LED matrix are:

1. Display of the most significant byte of the address bus. In this mode, each LED represents activity on a page of 256 bytes. Thus an overview of all 65,536 bytes of memory can be seen in the form of both access and program flow activity.

2. Display of the least significant byte of the address bus. In this mode each LED represents activity at a particular byte within one page of memory by setting the page as a bit value condition on the high-address bus. In this case, a detailed view of program flow or data activity can be discerned. Program loops can be seen vividly; subroutine calls to another page are inherently marked by brighter LEDs; and one time code paths can be seen as flashes of a group of LEDs.

3. Display of the data bus with the address bus conditioned for a particular value. The contents of a memory location can be watched dynamically or data flowing through an I/O port can be examined.

The disclosed device can be used by programmers, engineers, and technicians to debug software and, to a limited extent, troubleshoot new circuit designs and test units on a production line or in the field. When used for testing, the apparatus of the invention has a primary strength in detection of instabilities, and intermittants. Other faults may be made detectable in some cases by adding to the computer test software which is designed to permit faults to manifest themselves in the signals that are displayed by the apparatus of the invention. Also, displayed images from a properly operating system can be recorded for later comparision with images of systems under test so that one can determine if the system under test is operating properly. In software analysis, besides its primary debugging function, the apparatus can be used to find critical software sections that would most benefit from optimization. It can also be used as an educational aid to understanding computer activity as information is displayed in a natural and real-time format.

Much of the benefit provided by the disclosed device is a result of its compatability with the way users think about computer activity and the way the human visual system works. Also, because of the varying brightness of display sections, the formation of seemingly fixed patterns, and dynamic movements resulting from a real-time view, a large amount of information is available for analysis. Experience in using the apparatus of the invention has demonstrated that the natural presentation yields a number of benefits:

1. Fixed patterns formed by a group of active pixels are quickly associated with system functions making interpretation of displayed activity often effortless and instantaneous.
2. Changes in activity stand out, drawing attention to often important events.
3. The interpretation of duty cycle through brightness is very natural and quick.
4. Binary related problems stand out in a visually natural way due to the binary code ordering of the pixels and the power-of-two dimensions of the display.
5. Program code that should not be (but is) active stands out clearly by lighting up.
6. Instabilities stand out as fluttering or randomly changing displays.
7. Because the dimension of time is within the user, events in a real-time system under analysis that are visible or audible have a direct and hence intuitive correlation with activity on the display of the disclosed instrument.
8. Because of the large amount of information presented at the display the user spends less time requesting information from the apparatus and more time following clues to problems which are often abundantly available on such a display.

There are many variations and additions to the basic apparatus summarized above, which will become apparent to those skilled in the art upon examination of the accompanying drawings and description of the preferred embodiment.

DESCRIPTION OF A PREFERRED EMBODIMENT

Figure 1:
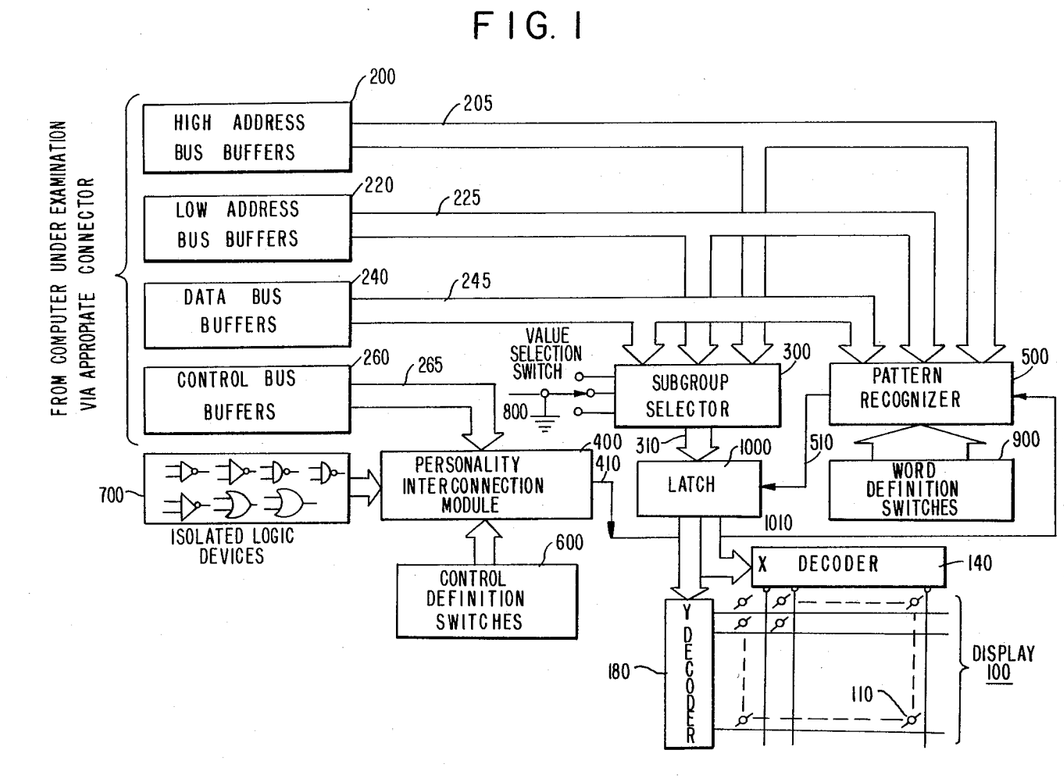
FIG. 1 is a block diagram of the apparatus of the invention.

Referring now to FIG. 1 there is shown a block diagram of the apparatus of the invention. An appropriate electrical connector and cable, illustrated in FIG. 2, transmit signals from the computer under examination to HIGH ADDRESS BUS BUFFERS 200, LOW ADDRESS BUS BUFFERS 220, DATA BUS BUFFERS 240, and CONTROL BUS BUFFERS 260. These buffers minimize the load imposed by the instrument on the monitored signals and also remove any extraneous noise present in the signals. These buffers may be independent devices or may be inherent in or built into the SUBGROUP SELECTOR 300 and/or the PATTERN RECOGNIZER 500 circuits to which they are connected in the case of data and address bus signals.

CONTROL DEFINITION switches 600 permit selection of those states of the control bus that constitute a condition to be met before information will be displayed and may include switches for selecting: READ versus WRITE, I/O versus MEMORY, and ROM versus RAM. These switches, a set of isolated LOGIC DEVICES 700, and the buffered control bus signals 265 are interconnected by an interchangeable PERSONALITY INTERCONNECTION MODULE 400. This PERSONALITY INTERCONNECTION MODULE 400 is designed as an adapter for the particular computer type to be examined using the apparatus of the invention. A single output signal is produced on line 410 which goes active when the control bus of the computer under examination matches the selected conditions.

SUBGROUP SELECTOR 300 routes a selected subset of its input signals 205, 225, 245 to its output in accordance with the setting of a VALUE SELECTION SWITCH 800. The selected subgroup outputs 310 are coupled to a storage LATCH 1000.

WORD DEFINITION SWITCHES 900 permit selection of those values on the address and data buses that constitute a passing condition. In this embodiment there are switches 900 for each bit of the input signals 205, 225, 245 which may be set to select ONE, ZERO, or DON'T-CARE.

PATTERN RECOGNIZER circuit 500 provides an active or pulsed output on line 510 when both the values of the bus signals from the computer under examination match the conditions selected by the WORD DEFINITION SWITCHES and the control bus signals match the conditions selected by the CONTROL DEFINITION SWITCH 600. The PATTERN RECOGNITION circuit 500 is coupled to the LATCH 1000 control input via line 510, and the SUBGROUP SELECTOR outputs 310 are coupled to the LATCH data inputs so that the selected subgroup of monitored signals is stored in the LATCH 1000 whenever all selected conditions are met.

Finally, the LATCH 1000 is coupled to the DISPLAY 100 and selected signals 310 are displayed when selected conditions occur. The DISPLAY 100 displays the selected signals from the first time the conditions match until the next time the conditions match. The X DECODER 140 and the Y DECODER 180 of the display circuitry decodes the latched signals 1010 so that a unique pixel 110 is activated for each possible state of the LATCH outputs 1010.

Figure 2:
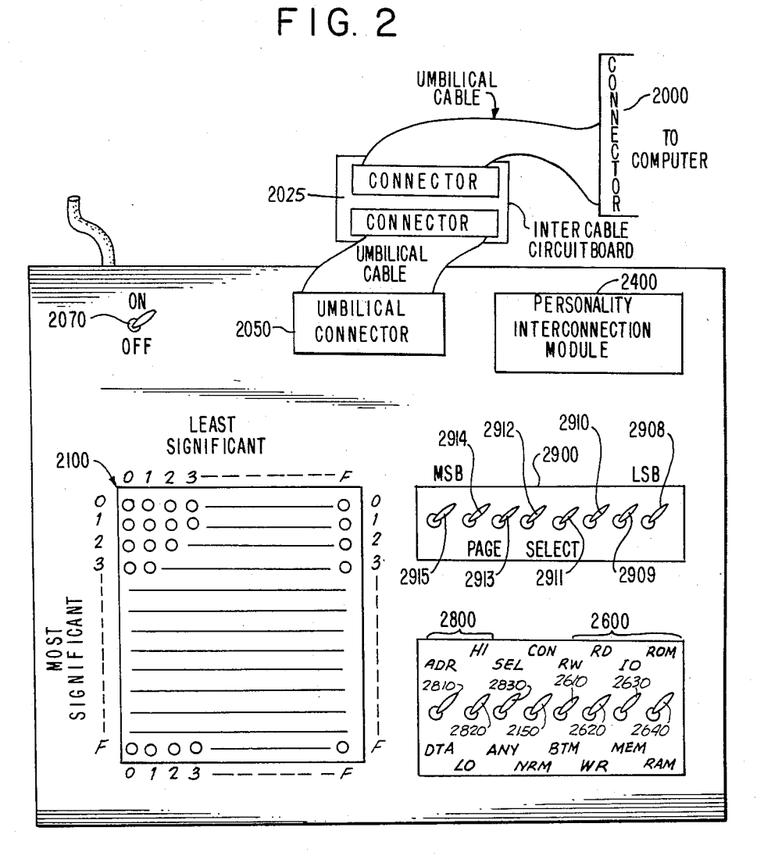
FIG. 2 shows the operator controls, display, and personality components of a preferred embodiment of the invention and illustrates cables for interconnection with a computer to be examined.

Referring now to FIG. 2, there is shown the physical layout of the operator's panel of a preferred embodiment of the apparatus of the invention using a Light Emitting Diode (LED) display panel 2100 for display of monitored signals from a microcomputer (not shown) under examination. Connector 2000 is chosen to be compatible with the computer under examination and permit access to the signals to be monitored. In many instances connector 2000 may be compatible with a number of computers from different manufacturers. In such instances, however, the signals at particular pins of the connector may differ from computer to computer. Therefore, there is provided an INTERCABLE CIRCUIT BOARD 2025 that may be custom wired so that the desired signals are connected to the appropriate pins of the UMBILICAL CONNECTOR 2050 of the apparatus of the invention. Alternatively, the UMBILICAL CABLE can simply be a cable with a connector on one end that is matched to the UMBILICAL CONNECTOR 2050 of the instrument and on the other end a connector matched to the computer under examination. The wiring of the connectors is made so as to route the appropriate computer output signals to the correct inputs of the apparatus of the invention. In either case, the data bus, address bus, and control bus signals are thereby carried from the computer to the appropriate inputs of the instrument of the invention.

As was described in the discussion of the block diagram of FIG. 1, differing computers require different PERSONALITY INTERCONNECTION MODULES to adapt the control bus signals for use in the apparatus of the invention. A forty (40) pin connector socket at 2400 is provided for ease of interchanging such modules.

In the upper left-hand portion of the control panel shown in FIG. 2, there appears an on/off toggle switch 2070 used to apply power to the circuits of the instrument. In the preferred embodiment all of the integrated circuit modules operate on +5VDC and an appropriate regulated AC to DC power supply shown in FIG. 3A is included in the instrument. A.C. power is obtained using a standard step-down transformer 6.3 VAC power pack and applied to the instrument through jack J1. Appropriate battery power may also be used as is known to those skilled in the art.

Also shown in FIG. 2 is a pair of two-position toggle switches 2800 whose function is that of the VALUE SELECTION SWITCH 800 in FIG. 1. When the ADR/DTA switch 2810 is in the DTA position, the DATA bus is routed by the SUBGROUP SELECTOR 300 (FIG. 1) to the LATCH 1000. When the ADR/DTA switch is in the ADR position, either the low address or high address bus becomes the subgroup. When the HI/LO switch 2820 is in the HI position, the high address bus is selected and in the LO position, the low address bus is selected. Thus the ADR/DTA and HI/LO switches work together to select the desired subgroup of monitored signals which gets routed to the LATCH 1000 for display on DISPLAY 2100.

The SEL/ANY switch 2830 works with the PAGE SELECT SWITCHES 2900. When the SEL/ANY switch 2830 is in the SEL position, the PAGE SELECT switches 2900 are enabled. The PAGE SELECT switches 2900 are 8 of the possible WORD DEFINITION SWITCHES 900 shown in FIG. 1. In this embodiment these switches form a condition on the binary value of the 8 most significant bits of the address bus when switch 2830 is in the SEL position. This value is compared to the values from the computer under examination in the PATTERN RECOGNIZER 500 in the manner described hereinbelow. In this embodiment therefore the operator can define which 256 byte page of a 65,536 byte memory is to be displayed on DISPLAY 2100; hence, the designation PAGE SELECT. It will be understood by those skilled in the art that additional WORD DEFINITION switches 900 may be added so that all of the possible conditions of bit values on the ADDRESS bus and DATA BUS may similarly be made preconditions for the information that is displayed. Although this preferred embodiment of the invention is configured for examination of 8 bit microcomputer types, it may be readily appreciated that the principles of the invention are equally applicable to computers having a smaller or larger number of bits, such as, for example, 16 bit microcomputer types.

PAGE SELECT switches 2900 are three-position toggle switches settable to represent a value condition of ONE, ZERO, or DON'T-CARE for each bit of the HIGH ADDRESS bus. These switches are arranged in conventional fashion from the Most Significant Bit (MSB bit 15) at the left switch 2915 to the Least Significant Bit (LSB bit 08) switch 2908 at the right.

When the SEL/ANY switch 2830 is in the ANY position, "any" condition of the high address bus will be accepted by the PATTERN RECOGNIZER circuit 500. The ANY position of this switch is simply a convenient way of gaining the effect of setting all of the PAGE SELECT switches 2900 to the DON'T-CARE position.

Referring again to the lower row of switches in FIG. 2, there is shown a two-position toggle switch designated a CON/NRM switch 2150. When the CON/NRM switch is in the CON position, the least significant half of the LATCH 1000 is held in the zero state, thereby "condensing" the display into the leftmost column of pixels. The utility of this function is to increase the visibility of some types of displayed activity that might be too dim to otherwise be seen. The NRM position is for normal full display operation.

The next group of switches 2600 in this row are two position toggle switches that perform the function of the CONTROL DEFINITION switches described above in connection with FIG. 1. When the RW/BTH switch 2610 is in the RW position and the RD/WR switch 2620 is in the RD position, only reads (from memory, I/O, etc) will be displayed. When the RW/BTH switch 2610 is in the RW position and the RD/WR 2620 switch is in the WR position, only writes will be displayed. When the RW/BTH switch 2610 is in the BTH position, BOTH reads and writes will be displayed. When the IO/MEM switch 2630 is in the IO position, only INPUT/OUTPUT port activity will be displayed. When the IO/MEM switch 2630 is in the MEM position, only MEMORY activity will be displayed. When the instrument is used with computers that have only memory addressing, the PERSONALITY INTERCONNECTION MODULE 2400 is conditioned to disable the IO/MEM switch 2630. Finally, for computers that have seperate address spaces for ROM and RAM, the ROM/RAM switch 2640 set to ROM causes only ROM activity to be displayed. In the RAM position, only RAM activity is displayed.

Figure 6:
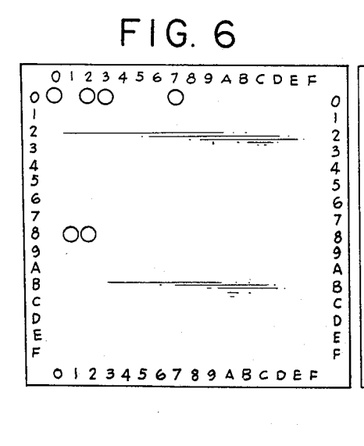
FIG. 6 shows an illustrative example of the state of the display of a preferred embodiment when monitoring a high-address bus.
Figure 7:
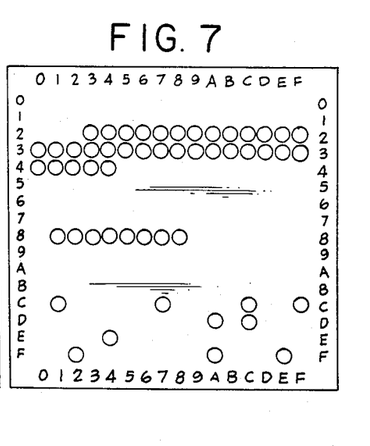
FIG. 7 shows an illustrative example of the state of the display of a preferred embodiment when monitoring a low-address bus.

As shown in FIG. 2, the DISPLAY 2100 of the embodiment being described has a matrix of 16 by 16 pixels. The perimeter of the display is marked with hexidecimal digits to allow for convenient conversion of an active pixel to its associated value. The horizontal position of a pixel determines the least significant digit of its hexidecimal value and its vertical position the most significant digit of its hexidecimal value. For example, FIG. 6 shows a possible display with value selection switches 2800 set to the ADR, HI mode, the SEL/ANY to the ANY mode and the switches 2600 in the BTH, MEM mode. In the figure the pixels appear stable and even in brightness which would not necessarily be the case in actual operation. In FIG. 6 the display indicates that the most significant half of the address bus is accessing information in memory that is within pages 00, 02, 03, 07, 81H, and 82H ('H' signifying a hexidecimal number). In other words, these values occur on the high address bus when the selected conditions are met. In this mode each pixel represents a 256 byte area of memory and an overview of all 65,536 bytes is seen at once. FIG. 7 shows a possible display with switches 2800 in the ADR, LO modes, the SEL/ANY switch in the SEL mode and switches 2600 in the BTH, MEM modes. Here a particular page is selected on the PAGE SELECTION switches 2900, thus each pixel corresponds to activity at one byte in memory. Assuming the selected page is in the program area, one could conclude that program code from 23H to 44H is looping and that a short subroutine located from 81H to 88H is being called repeatedly. Random points from a lookup table or the like are shown accessed at the lower portion of the display.

Figure 3:
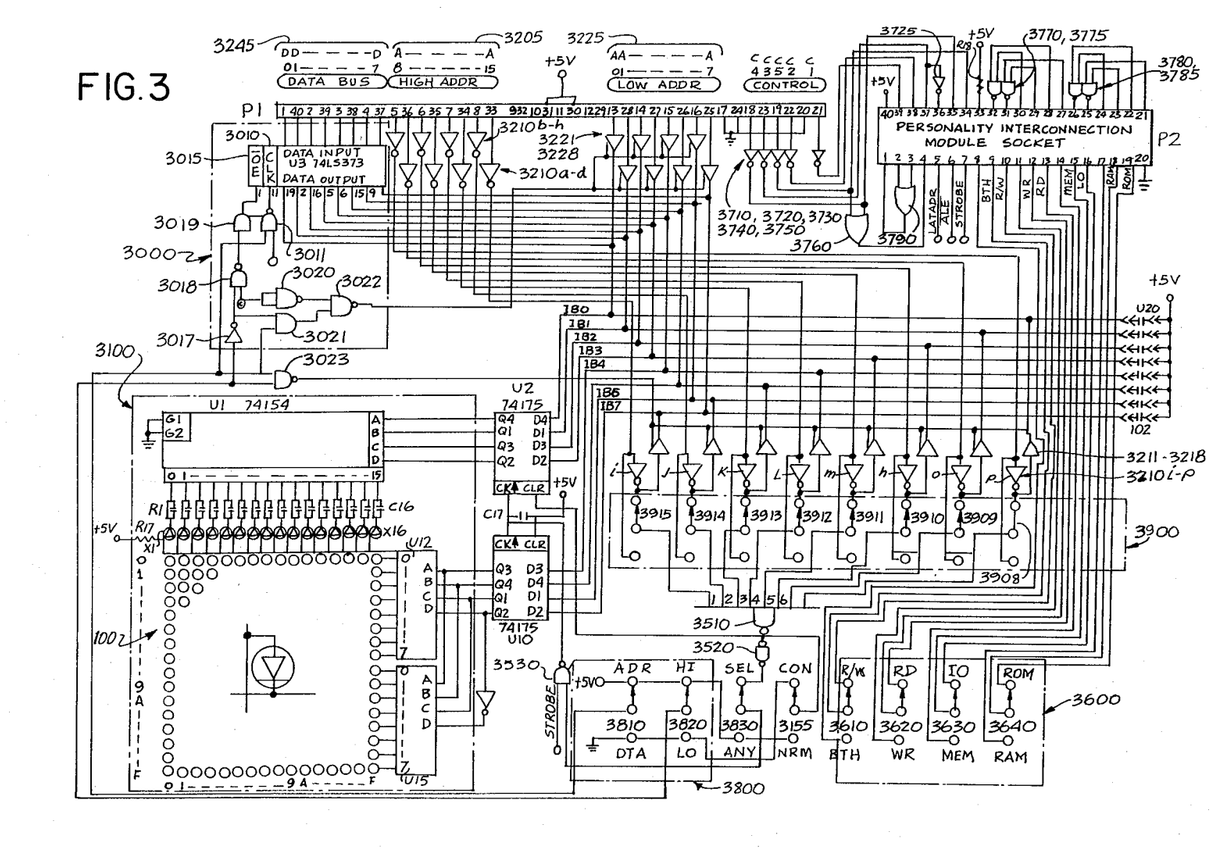
FIG. 3 is a schematic diagram of the circuitry of a preferred embodiment.
Figure 3A:
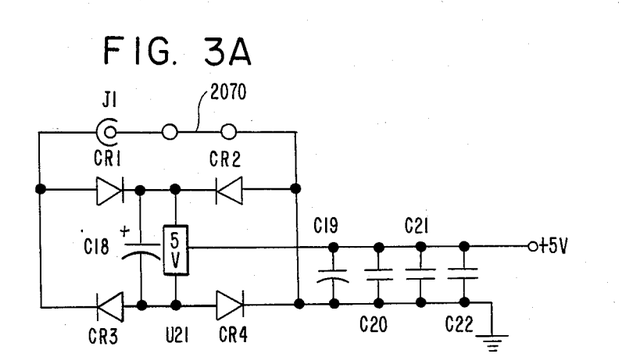
FIG. 3A is a schematic diagram of the AC to DC power supply.

Referring now to FIG. 3, signals from a computer being monitored are received through a cable at 40 pin connector P1. Pins on this connector will be referred to as P1-1 through P1-40. The data and address bus signals are received in proper order and are labeled D0–D7 for the 8 data bus bits, A8–A15 for the HIGH ADDRESS bus bits and A0-A7 for the LOW ADDRESS bus bits. The CONTROL BUS signals are received at pins P1-18, P1-19, P1-21, P1-22, and P1-23. The GROUND reference signal from the computer under examination is received at pins P1-17, P1-20, and P1-24. All received signals are fed to LSTTL (Low Power Schottky Transistor Transistor Logic) devices which function as the buffers 200, 220, 240, and 260.

Also shown at the upper right of FIG. 3 is a 40 pin socket P2 designated PERSONALITY INTERCONNECTION MODULE SOCKET. This socket facilitates the insertion and removal of the PERSONALITY INTERCONNECTION MODULES 400 used to adapt the apparatus of the invention to a variety of computer devices.

Referring to connector P1, the CONTROL BUS signals are fed to inverters 3710, 3720, 3730, 3740, and 3750 which function to buffer and invert the signals. Analysis of current popular microcomputers has shown that a smaller selection of ISOLATED LOGIC DEVICES results when these signals are inverted. Further optimization of the number of isolated logic devices is achieved when the control bus input on P1-23 is fed to the PERSONALITY INTERCONNECTION MODULE through inverter 3720 directly to P2-37 and reinverted through inverter 3725 to P2-36. Also for optimization, two other control bus signals are fed through inverters 3710 and 3730 directly to P2-35 and P2-34 respectively, and through OR gate 3760 to P2-4. The ISOLATED LOGIC DEVICES 3770, 3775, 3780, 3785, and 3790 are wired directly to the pins of the PERSONALITY INTERCONNECTION MODULE socket to accommodate a wide range of currently popular 8-bit microcomputers. Thus, P2-28 and P2-30 are connected to P2-32 through NAND gate 3770; P2-27 and P2-29 are connected to P2-31 through NAND gate 3775; P2-22 and P2-24 are connected to P2-26 through NAND gate 3780; P2-21 and P2-23 are connected to P2-25 through NAND gate 3785; and P2-2 and P2-3 are connected to P2-1 through OR gate 3790. The operation of the ISOLATED LOGIC DEVICES in conjunction with a particular PERSONALITY INTERCONNECTION MODULE is discussed hereinbelow in connection with FIGS. 4 and 5.

Referring again to FIG. 3, also connected to the PERSONALITY INTERCONNECTION MODULE socket P2 are the CONTROL DEFINITION SWITCHES 3600 which are labeled RW/BTH 3610, RD/WR 3620, IO/MEM 3630, and ROM/RAM 3640. These single-pole-double-throw switches are fed directly to P2 using three wires per switch.

The PERSONALITY INTERCONNECTION MODULES 400 are implemented as small printed circuit boards with 40 pin connectors. The modules, can be interchanged by simple removal and insertion into fixed socket P2, which interconnects the CONTROL BUS signals, the ISOLATED LOGIC DEVICES, and the CONTROL DEFINITION SWITCHES so as to provide, in proper manner and for each particular computer type, three output signals: "STROBE" at P2-7; "$\overline{ALE}$" at P2-6 and LATADR at P2-5. The STROBE signal is high when the condition selected on the CONTROL DEFINITION SWITCHES matches the state of the control bus signals from the computer under examination. $\overline{ALE}$ and LATADR relate to the ADDRESS DEMULTIPLEXOR circuit 3000—an additional circuit that provides direct and convenient compatability with microprocessors having a multiplexed address/data bus. The $\overline{ALE}$ signal from P2-6 goes low when the computer under examination is presenting low address information on its multiplexed address/data bus. If the processor has separate buses, $\overline{ALE}$ is held low. The LATADR P2-5 signal signifies to the instrument that the microprocessor has a multiplexed address/data bus if high, or a normal seperate bus structure if low.

Referring now to the upper left-hand portion of FIG. 3, there appears the ADDRESS DEMULTIPLEXER circuitry 3000. The block designated U3 is a standard LSTTL integrated circuit type 74LS373, manufactured by Signetics Corp. of Sunnyvale, Calif. U3 operates as an 8-bit latch with level sensitive CLK input 3010. The latch U3 accepts, and presents to its output, the input data when CLK is high and latches up when CLK is low. A level sensitive output enable ($\overline{OE}$) input 3025 presents stored data at the outputs when $\overline{OE}$ is low and causes the outputs to float in the tri-state when $\overline{OE}$ is high. This device, being of LSTTL, buffers the incoming signals, demultiplexes the address/data bus when required, and by means of its tri-state outputs performs part of the SUBGROUP SELECTOR 300 function (FIG. 1). A boolean interpretation of the gate 3011 that controls the CLK input shows that the latch U3 goes transparant, i.e., passes its input to its output when either ALE goes low or when the ADR/DTA 3810 switch is in the DTA mode. The latch U3 is transparent when the DATA subgroup is selected regardless of the type of microprocessor. This is desireable because the multiplexed microprocessor types put their address-/data bus in data mode when the control bus functions are activated. Additionally, the latch locks (CLK=0) only when an address subgroup is selected and $\overline{ALE}$ P2-6 is high. This is desired because address information is stored in the latch U3 and the latch U3 must be unlocked when $\overline{ALE}$ P2-6 is low.

Moving attention now to the HIGH ADDRESS BUS signals 3205 coming in via connector P1 and designated A8-A15, each of these signals flows through a series of two inverters 3210 a-p and a non-inverting buffer having tri-state outputs 3211-3218. The function of the first inverters 3210 a-h is simply to act as a buffer. Without this first inverter, two gate loads would be present with one of switches 3908-3915 in the down position and the use of an inverter instead of a plain buffer is mostly a matter of printed circuit board trace effeciency. The second inverter performs part of the function of the PATTERN RECOGNIZER circuit 500 described below and also restores the positive logic of the monitored signal. The tri-state buffers 3211-3218 perform part of the SUBGROUP SELECTOR 300 function by enabling selection of the HIGH ADDRESS BUS 200 subgroup.

The PATTERN RECOGNIZER 500, the function of which is to determine when the WORD DEFINITION SWITCHES 3908-3915 are matched by the monitored value, is implemented in part by means of the eight inverters 3210 i-p that feed the tri-state buffers, and the eight input NAND gate 3510. WORD DEFINITION SWITCHES 3908-3915 are single-pole-double-throw toggle switches of the ON-OFF-ON type. When the selector arrow of the switchs 3900 in FIG. 3 points to the top terminal (for example, the output terminal of inverter 3210 i), a ONE condition is selected; when pointed to the bottom terminal (for example, the output terminal of inverter 3210 a), a ZERO condition is selected; and when to neither terminal (off), a DON'T-CARE condition is selected. Assuming that inputs of the eight input NAND gate 3510 float to the logic high state when left open, it can be seen that the output of this NAND gate 3510 will indeed reflect whether or not, in totality, the settings on the WORD DEFINITION SWITCHES 3908-3915 match the state of the signals on the HIGH ADDRESS bus by going low upon a match. If required, pullup resistors can be used at the inputs of the NAND gate to insure a logic high for the off position of the switches. Next, a NAND gate 3520 inverts this signal providing a logic high when the selected conditions are matched by the monitored signal. The SEL/ANY switch 3830 is interconnected so that its center terminal reflects the matching of the selected conditions when in the SEL position, or a forced match when in the ANY position, which is equivalent to setting switches 3908-3915 to the DON'T-CARE position. The final output of the PATTERN RECOGNIZER 500 is obtained from a NAND gate 3530 that requires both the CONTROL DEFINITION SWITCH conditions and the WORD DEFINITION SWITCH 3900 conditions be matched by the monitored signals. Upon a match, this enable strobe signal goes low returning high to trigger LATCHES U2 and U10.

Referring now to the center portion of FIG. 3 there is shown an internal bus formed by signal lines designated IB0 through IB7. Signals from the buffered DATA BUS via LATCH U3, from the buffered HIGH ADDRESS BUS via 3211-3218, and from the buffered LOW ADDRESS BUS are all connectable to this internal bus via tri state devices. The SUBGROUP SELECTOR 300 function is accomplished by enabling the appropriate tri state device.

The ADDRESS DEMULTIPLEXOR circuity 3000 performs part of the functions of the SUBGROUP SELECTOR 300 as follows: In the multiplexed data/address mode, (i.e., LATADR P2-5 is high) boolean analysis of logic gates, 3017, 3018, 3019 results in output from latch U3, of information stored or passed by that latch, onto the internal bus IB0-IB7 when that information is selected. Thus, if switch 3810 is in the DTA position, data bus information 3245 is passed to the internal bus IB0-IB7. If the switch 3810 is in the ADR position and switch 3820 is in the LO position, then LO ADDRESS information, which has been clocked into LATCH U3 in accordance with the $\overline{ALE}$ P2-6, is passed to bus IB0-IB7. Similar analysis of logic gate 3023, with switch 3810 in the ADR position and switch 3820 in the HI position enables tri state devices 3211-3218 to pass HIGH ADDRESS information to bus IB0-IB7. Finally, if the computer under examination does not have a multiplexed address/data bus (i.e., LATADR is Low) boolean analysis of logic gates 3017, 3020, 3021, and 3022 results in the enabling of tri state devices 3221-3228, when switch 3810 is in the ADR position and switch 3820 is in the LO position, thus passing LOW ADDRESS signals 3225 to internal bus IB0-IB7.

In the embodiment depicted in FIG. 3, the LATCH 1000 (FIG. 1) is comprised of two type 74175 integrated circuits from the Signetics Corp. and designated U2 and U10. The inputs to LATCH U2 are the signals on internal bus IB0-IB3 and the inputs to LATCH U10 are the signals from IB4-IB7. Thus the information selected for display by setting switches 3600, 3800, and 3900 is stored in LATCHES U2 and U10 for transfer to the display circuitry 3100. The CLR (clear) input to LATCH U2 is connected to the center pole of toggle switch 3155, the CON/NRM switch. In the CON position the CLR input of U2 is held low thereby clamping the output of U2 at zero and condensing the display to only the most significant bits of the information selected to be displayed. In the NRM position the CLR input of U2 is held high and therefore U2 functions normally. The CK inputs of U2 and U10 are connected together and to the output of NAND gate 3530. One of the inputs to gate 3530 is the STROBE from the PERSONALITY INTERCONNECTION MODULE. The other input is the center pole of toggle switch 3830, the SEL/ANY switch. Therefore the information on internal bus IB0-IB7 is clocked through LATCHES U2 and U10 when either of these two inputs to NAND gate 3530 return low.

The output of LATCH U2 is connected to U1 which is a 4 line to 16 line decoder with inverting outputs. A typical integrated circuit of this type is a 74154 from Signetics Corp. Each output of U1 is fed thru a resistor (R1-R16) and capacitor (C1-C16) to the base of a transistor (X1-X16). The resistor limits current to the transistor and the capacitor serves to speed response time of the display. Each transistor is used as a column driver with display drive current limited by resistor R17. The outputs of LATCH U10 are connected to U12, U15, and an inverter which form another 4 line to 16 line decoder, also with inverting outputs. In this second decoder, however, Signetics Corp. type 7445 decoders are used which have drivers built in. The outputs of the decoders are connected to the columns and rows of the LED matrix providing a 256 pixel display array 3150.

Only one column and row can inherently be active at one time and with the column being pulled up and the row being pulled down, the LED at their intersection is turned on.

Experimentation and calculation has revealed one set of parts in the display section that work well together with the desireable properties of high display brightness and fast pixel transition times. These values are: R1 to R16=2200 ohms, C1 to C16=0.001 mfd, X1 to X16=PN 2907, R17=30 ohms. The LEDs are Litronix CQV-20-3. Additionally, a translucent red plastic filter placed over the LED display improves visibility.

Using these particular components, experimentation regarding visibility of short events was done. It was found that an observer could see a single flash of 10 microseconds under typical room ambient lighting quite easily. A flash of 1 microsecond under very low ambient lighting was also visible.

U20, a socketed 0.001 mfd capacitor module, is placed on the internal bus signals to create a short delay required by certain computer types such as the Zilog Z80 CPU. C17, a 100 pf capacitor connected from +5 V to the CK input of LATCHES U2 and U10 removes possible spikes on the latch clock signal.

Figure 4:
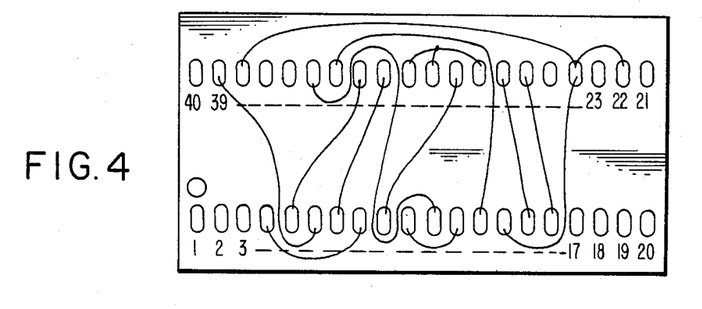
FIG. 4 shows at two times scale the printed circuit board layout of an illustrative personality interconnection module.
Figure 5:
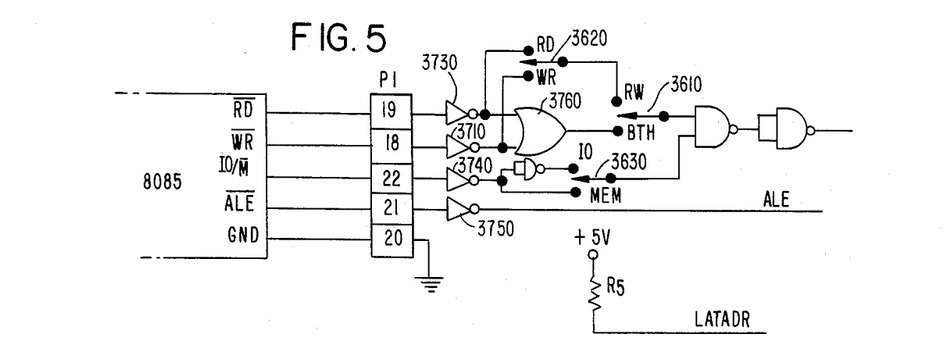
FIG. 5 is a schematic diagram of the circuit formed by the personality interconnection module of FIG. 4 used in the apparatus of FIG. 3.

Referring now to FIGS. 4 and 5, a description of an illustrative personality module will now be given. FIG. 4 shows a schematic diagram of a PERSONALITY INTERCONNECTION MODULE printed circuit board designed to allow use of the FIG. 3 embodiment of the invention with an Intel Corporation type 8085 microprocessor. The printed circuit board layout shown in FIG. 4 is received by the PERSONALITY INTERCONNECTION MODULE socket shown in FIG. 3. Male header pins are attached to the printed circuit so that it can be plugged into its socket. The orientation dot shown on the circuit corresponds to Pin 1 of the socket. Referring to FIG. 3 and FIG. 4, and tracing the interconnections formed by the printed circuit results in the circuit shown in FIG. 5.

The circuit shown in FIG. 5 works as follows: The 8085 microprocessor has four relevant control bus signals: $\overline{RD}$, $\overline{WR}$, IO/$\overline{M}$, and ALE. $\overline{RD}$ goes low during a read operation; $\overline{WR}$ goes low during a write operation; IO/$\overline{M}$ is high during an Input/Output operation and is low during a Memory operation; ALE (Address Latch Enable) goes high when the multiplexed address/data bus contains low address information to be latched. All four control bus signals are routed to connector P1 shown in FIG. 3. Prior to connection to the pins of the PERSONALITY INTERCONNECTION MODULE socket, each of these signals is buffered and inverted by inverters 3710, 3730, 3740, and 3750. Additionally, the RD and WR signals are OR'ed by OR gate 3760. It can be seen from the circuit of FIG. 5 that when the CONTROL DEFINITION SWITCHES 3610 and 3620 are set to RW and RD, respectively, the STROBE signal will become active only during READ operations. Similarly, a setting of RW and WR will allow STROBE to become active only during WRITE operations. When the RW/BTH switch 3610 is in the BTH position either reads or writes will be acceptable. When the IO/MEM switch 3630 is in the IO position, STROBE will not become active unless an I/O operation is in progress (IO/$\overline{M}$ high); and when the IO/MEM switch is in the MEM position, STROBE will not become active unless a Memory operation is in progress. Note that the ROM/RAM switch is left out of the circuit of FIG. 5 as the 8085 does not seperate these two types of memory. ALE will go low when the microprocessor wants to latch the low address data and LATADR will always be high to signify a multiplexed type microprocessor.

Figure 9:
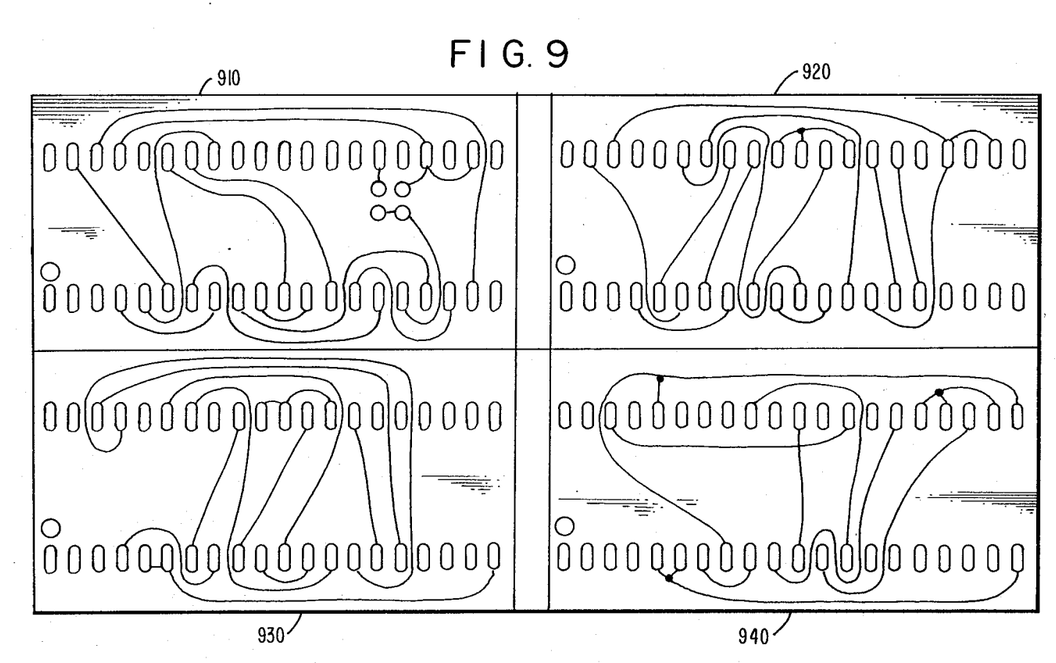
FIG. 9 shows at two times scale the printed circuit board layouts of illustrative personality interconnection modules.

Referring to FIG. 9 there are shown three additional PERSONALITY INTERCONNECTION MODULE printed circuit boards in a production layout. Module 920 is the module of FIG. 4 discussed above. Module 910 is for use with the 8035 microcomputer of Intel Corp. Module 930 is for use with the Z80 microcomputer of Zilog Corporation. Module 940 is for use with the 6800 microcomputer of Motorola Corp. By tracing the interconnections formed by the printed circuit a schematic similar to that shown in FIG. 5 can be developed for each of these additional modules. For this purpose with respect to the 8035 microcomputer and module 910 P1-18 receives $\overline{WR}$; P1-23 receives PROG; P1-19 receives $\overline{RD}$; P1-22 receives $\overline{PSEN}$ and P1-21 receives ALE. With respect to the Z80 and module 930; P1-18 receives $\overline{WR}$ and P1-23 receives $\overline{MREQ}$; P1-19 receives $\overline{RD}$ and P1-22 receives $\overline{IORQ}$. With respect to the 6800 microcomputer and module 940, P1-23 receives phi 2 ($\phi$2); and P1-22 receives R/$\overline{W}$.

Figure 8:
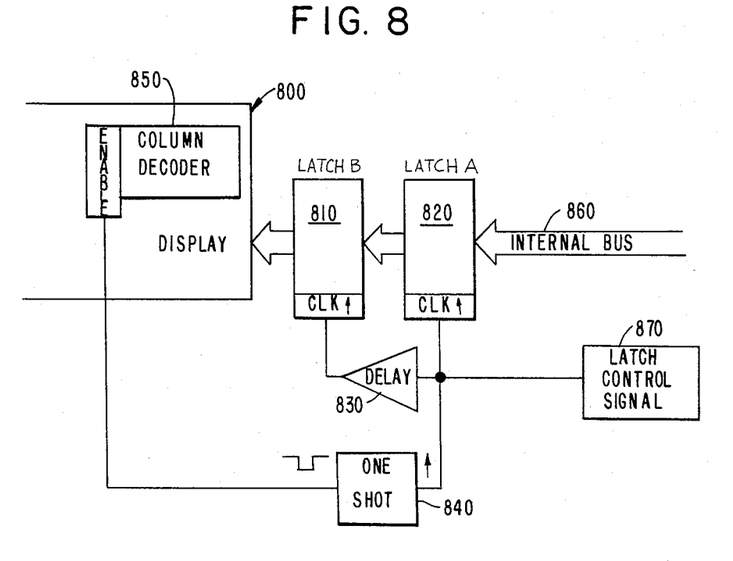
FIG. 8 is a block diagram of a preferred embodiment of an L-Ghost elimination circuit.

A concept that will be referred to as L-GHOSTING will now be described. Referring again to FIG. 3, it has been found that because of the differences in the circuits driving the columns in comparison with that driving the rows, there may be different settling times of these two circuits. Because of this difference the transition from one active pixel to another, which occurs when the value in the LATCH changes, may cause a stray pixel to be momentarily activated. If this occurs, the stray pixel would, in most implementations, be at the corner of an 'L' shape where the ends of the 'L' are at the initial and final active pixels—thus the term L-GHOSTING. It has been found that such a stray pixel is activated for such a short duration that in many cases it will never be seen. However, depending, in part, on the nature of the information being viewed, L-GHOSTS may become visible. Referring now to FIG. 8, there is shown a block diagram of a circuit to eliminate the phenonomen of L-GHOSTING. This circuit acts as a double buffer. Thus, when the LATCH CONTROL SIGNAL goes high to change to a new pixel, LATCH-A 820 immediately accepts the new information. However, because of a delay buffer, LATCH-B 810 retains the old information keeping a stable display. When the LATCH CONTROL SIGNAL 870 goes high, a one-shot 840 quickly disables the display by disabling the column decoder 850 which is the same as disabling both decoders. With the time constant of one shot 840 longer than delay buffer 830, LATCH-B 810 next accepts the new word. Since the display is now disabled, the decoder circuitry can take time to settle at its new value without activating any stray pixels. Lastly, the one-shot 840 output returns high and the display is activated with the new pixel from LATCH B 810 thus eliminating L-GHOSTING. For proper operation the time constant of the delay buffer 830 must be longer than the display disabling time and the time constant of one-shot 840 must be longer than the sum of the delay buffer, the LATCH-B 810, and the display decoder/driver settling time. Within this constraint both time constants should be as short as possible so as to maximize apparant display brightness.

While the above descriptions contain many specificities, these should not be construed as limitations on the scope of the invention, but rather as an exemplification of one preferred embodiment thereof. Many other variations are possible of which some are mentioned in what follows. Accordingly, the scope of the invention should be determined not by the embodiments illustrated, but by the appended claims and their equivalents.

It will be apparent to those skilled in the art that a more generalized sub-group selector would permit selection of any sequential set of eight adjacent bits without departing from the concept of the invention.

Similarly compatability with computers having a larger architecture than the 8-bit microcomputers described above would simply would require adding more subgroups, more word definition switches, and, if desired, a larger display. Thus, compatability with 16-bit microcomputers can be accomplished by dividing the data bus into two parts and the address bus in three parts (assuming a 24 bit address bus).

It will be apparent to those skilled in the art that a pattern recognition circuit that permits selection of a range of values can be substituted or added without departing from the concept of the invention.

Replacing the input buffers of the preferred embodiment with known input buffers having a variable threshold would allow for compatability with a wider variety of computers operating under more varied conditions.

Those skilled in the art will recognize that stretching the ON time of each pixel would allow for improved analysis of short events. This could be accomplished for example through the use of a 256 by 1 RAM connected with one memory position for each pixel. In such an alternative embodiment, instead of laoding a value to be displayed into a latch, the value would be used as an address for the RAM and at that address a one would be written. Additional circuits are used to scan through the pixel memory in numeric order activating those pixels that have a ONE in their associated RAM location. The pixel can thus be held on for a duration sufficient to guarantee visibility. This embodiment can also be used to lock activated pixels on indefinitely. Combining both modes of operation selectable within one instrument results in a sophisticated version of the invention with enhanced short duration event capability.

It will be recognized that, although an advantage of the disclosed instrument is that a CRT type display is not required, use of such a display medium is entirely compatible with the scope of the invention. In adapting to a CRT type display the digital decoders would be replaced by digital to analog converters with the analog output signals fed to a CRT equiped with appropriate driver circuits. The result is an even more compact version of the instrument which takes advantage of an external standard oscilloscope as the display.

I claim:

1. An apparatus for use in the operational analysis of a digital computer having control, address, and/or data signal buses, by displaying representations of selectable signals in response to the occurrence of selectable conditions comprising:
   (a) input buffering means, connectable to such a computer, for receiving a plurality of signals from signal buses within said computer and for outputting a plurality of buffered signals;
   (b) interchangeable personality definition means including digital logic means, connected to said input buffering means, for receiving buffered control bus signals and for outputting a control strobe signal, each such personality definition means adapting said apparatus for use with a particular computer;
   (c) first switch means, connected to said personality definition means, for selecting a state of said buffered control bus signals which defines a condition for output of said control strobe signal;
   (d) second switch means, including digital logic means, connected to said input buffering means, for selecting signals to be displayed from said address and/or data signal buses;
   (e) pattern recognizer means, including digital logic means, connected to said input buffering means, and said personality definition means for identifying states of address and data bus signals and outputting an enable strobe signal;
   (f) means connected to said pattern recognition means for defining digital values to be identified by said pattern recognition means;
   (g) storage means connected to said pattern recognizer means and said second switch means, for storing and outputting said signals selected to be displayed in response to said enable strobe and control strobe signals; and
   (h) display means connected to said storage means for displaying said selected signals.

2. The apparatus of claim 1 wherein said input buffering means further comprises digital device means for demultiplexing said control, address, and/or data signal buses whereby said apparatus is adapted for use with computers having multiplexed buses.

3. The apparatus of claim 1 wherein said display means is an array of light emitting diode pixels.

4. The apparatus of claim 3 wherein said pixels are arranged in a two dimensional 16×16 matrix.

5. The apparatus of claim 1 wherein said display means comprises digital to analog converters connected to said storage means and said display means is a cathode ray tube connected to said digital to analog converters.

6. The apparatus of claim 1 further comprising digital device means connected to said storage means and said display means for blanking said display means during a transition from the display of one state of the selected signals to the display of another state of the selected signals thereby eliminating erroneous activation of said display.

7. The apparatus of claim 1 wherein said storage means includes means for extending the duration of the on time that a state of said selected signal is displayed by said display means whereby the visibility of short duration signal events is increased.

8. The apparatus of claim 7 wherein said means for extending the duration of the time locks on displayed states of said selected signal.

* * * * *